United States Patent [19]

Hodge

[11] 4,384,747
[45] May 24, 1983

[54] BEARING FOR A SHAFT CUTTER STABILIZER

[75] Inventor: Lee R. Hodge, Corsicana, Tex.

[73] Assignee: Hughes Tool Company, Houston, Tex.

[21] Appl. No.: 244,410

[22] Filed: Mar. 16, 1981

[51] Int. Cl.³ ............................................. F16C 29/02
[52] U.S. Cl. ..................................... 308/4 A; 175/325
[58] Field of Search .............. 308/4 A, 6 R, 4 R, 214; 175/325; 166/341, 241

[56] References Cited

U.S. PATENT DOCUMENTS

| | | | |
|---|---|---|---|
| 3,948,578 | 4/1976 | Martin | 308/214 |
| 4,227,585 | 10/1980 | Glass | 175/325 |
| 4,235,485 | 11/1980 | Reiter | 308/214 |
| 4,293,039 | 10/1981 | Mullins et al. | 166/341 |

*Primary Examiner*—Lenard A. Footland
*Attorney, Agent, or Firm*—Robert A. Felsman; James E. Bradley

[57] ABSTRACT

A stabilizer for attachment to a drill string in shaft drilling has an improved bearing. The stabilizer has an inner hub that is rigidly secured to the drill string above the bit. An outer hub encircles the inner hub. The outer hub has a centralizing device that extends laterally outward for frictionally engaging the walls of the shaft if the drill string wanders off-center. The bearing between the inner and outer hubs includes a plurality of rollers rotatably mounted to one of the hubs and in rolling contact with the other of the hubs to allow rotation of the hubs with respect to each other. In the preferred embodiment, the hub opposite the one containing the rollers has frusto-conical rings that are engaged in rolling contact by the rollers.

5 Claims, 3 Drawing Figures

BEARING FOR A SHAFT CUTTER STABILIZER

BACKGROUND OF THE INVENTION

This invention relates in general to earth boring equipment and in particular to a stabilizer for centering a drill string in large diameter shafts.

One method of boring large diameter shafts, approximately 4 to 15 feet in diameter, includes rotating a large drill bit by a string of drill pipe. The drill pipe is normally much smaller in diameter than the shaft or the drill bit. Downward thrust is applied to the bit by large weights that surround the drill string and rest on the upper side of the drill bit. Because of some flexibility in the drill pipe, and the clearances between the weight stack and shaft wall, the bits have a tendency to deviate from a straight path.

To restrict deviation and keep the bit on course, a stabilizer is placed in the weight stack normally near the top. One type of stabilizer known to applicant has a cylindrical frame or hub that surrounds the drill pipe and is sandwiched between two weights. Extending from the central hub are radial arms with vertically oriented rollers mounted at the outer ends for rolling contact with the wall of the shaft. This type of stabilizer uses antifriction bearings in the rollers, which require extensive structure for lubrication and protection from the drilling fluid. Also, the weight of the rollers necessitates heavy supporting structure and makes them difficult to change. Furthermore, intermittent contact between the rapidly moving rollers and the shaft wall can promote a sloughing of the shaft wall.

A non-rotating stabilizer is shown in U.S. patent application Ser. No. 12,277, filed Feb. 15, 1979, the inventors being John M. Mullins and Joseph L. Kelly, Jr., now U.S. Pat. No. 4,293,039, issued Oct. 6, 1981. In that application, the centralizer structure does not rotate with the drill string. It has pads that frictionally engage the walls of the shaft when the bit wanders off-center. The pads are carried by an outer hub that encircles an inner hub. The inner hub is carried rigidly by the drill string for rotation therewith. A bearing between the inner and outer hubs allows the outer hub and centralizer arms to remain in non-rotating position as the drill pipe rotates. The bearing constitutes a number of resilient pads that frictionally engage upper and lower frusto-conical rings. The pads are lubricated by fluid in the shaft.

While the device of the above-mentioned patent application is successful, it would be desirable to reduce the sliding friction between the pads and frusto-conical rings so as to reduce consumption of the available drilling torque.

SUMMARY OF THE INVENTION

The stabilizer of this invention is a non-rotating type. It has an inner hub that is adapted to be secured to the drill string for rotation therewith. An outer hub encircles the inner hub. Centralizing means are carried by the outer hub. The centralizing means extends laterally outward for frictionally engaging the wall of the shaft when the bit wanders off-center. The bearing between the inner and the outer hubs constitutes a plurality of rollers rotatably mounted to one of the hubs and in rolling contact with the other of the hubs. In the preferred embodiment, a set of upper rollers engage a frusto-conical upper ring. A set of lower rollers engage a frusto-conical lower ring.

DESCRIPTION OF THE PREFERRED EMBODIMENT

Figure 1:
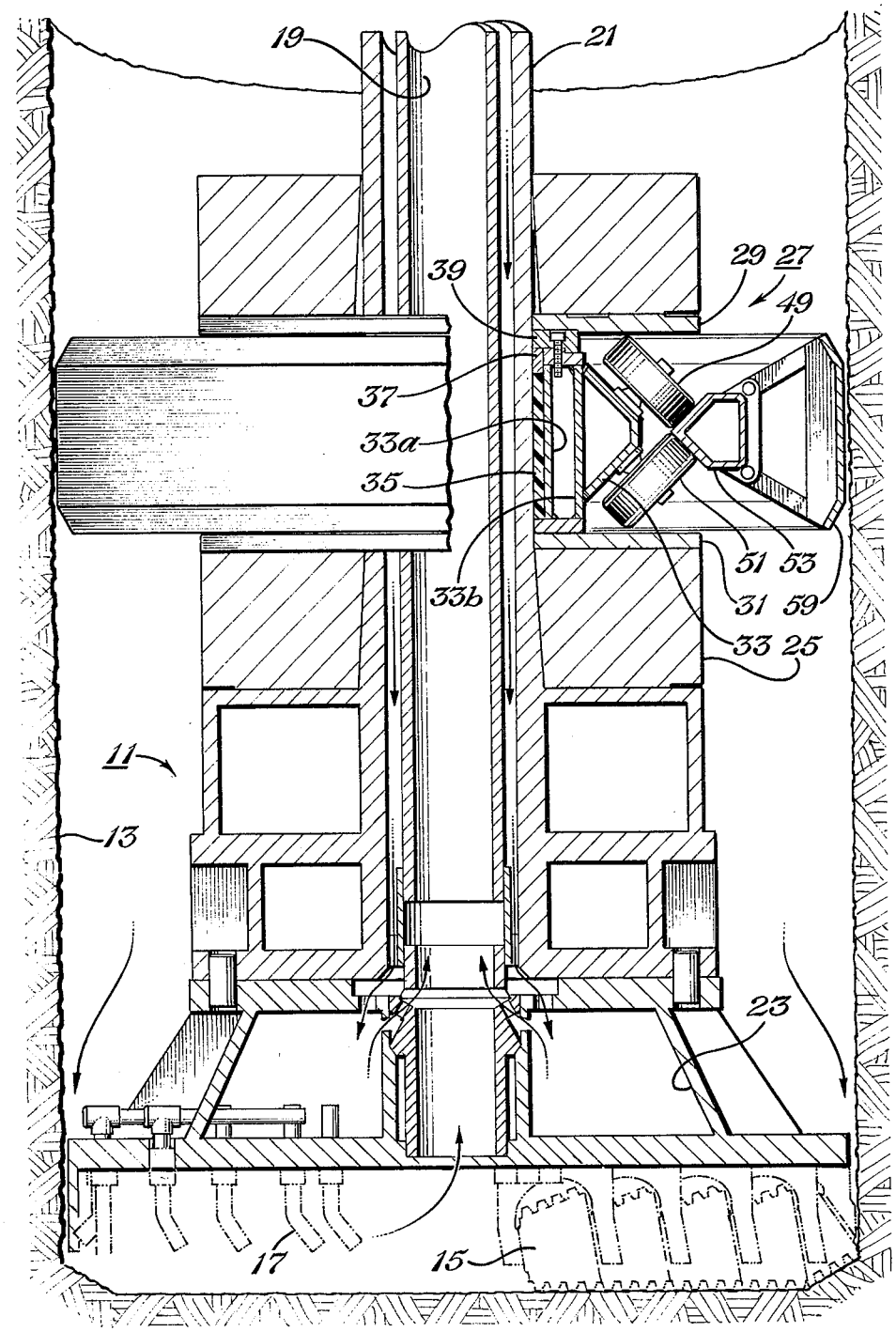
FIG. 1 is a fragmentary vertical sectional view of a stabilizer in accordance with this invention mounted above a drill bit, some of which is shown in phantom.
Figure 2:
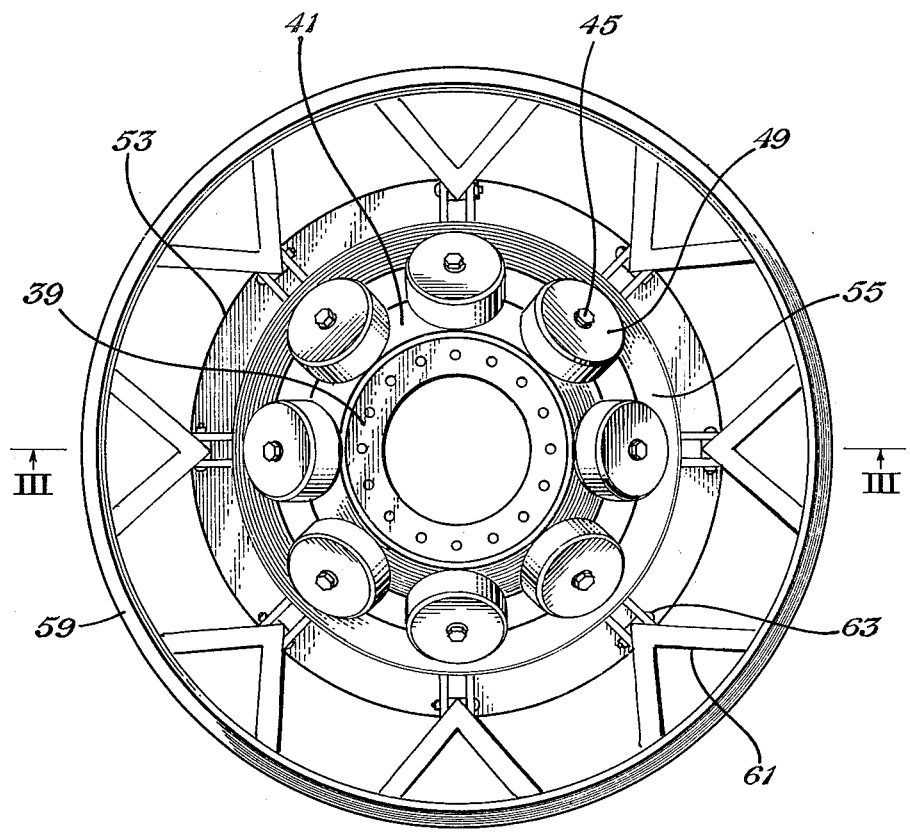
FIG. 2 is a top view of the stabilizer of FIG. 1, with the drill bit not shown.

Referring to FIG. 1, a large diameter earth boring drill bit or shaft cutter 11 is shown at the bottom of a shaft 13. Drill bit 11 is of a conventional type having a plurality of cutters 15 mounted to its bottom. Each cutter 15 is rotatable and has rows of steel teeth or tungsten carbide inserts for disintegrating the earth formations. A plurality of nozzles 17 are mounted to the drill bit bottom for discharging drilling fluid against the bottom of the shaft 13. Cutters 15 and nozzles 17 are shown in phantom and are rotated into the plane of the section to show their respective distances from the center of the drill bit 11.

Drill bit 11 is connected to a string of drill pipe for rotation therewith. The string comprises sections of inner pipe 19 mounted inside sections of outer pipe 21. Fluid, often a mixture of air and water, is pumped down the annular passage between the inner and outer pipes and into a separation chamber 23. As indicated by the arrows in FIG. 1, the air and water separate, with the air returning up the inner passage to induce circulation, and the water being discharged out the nozzles 17. The water discharged out of nozzles 17 combines with downwardly flowing water from the shaft 13, the combined stream being returned up inner pipe 19 along with cuttings.

Several cylindrical weights 25 are mounted above the bit to apply force for cutting. Weights 25 are in two halves, connected together on the drill string. Although only two are shown in the drawing, ten or more weights are sometimes stacked in the string.

A stabilizer 27 is placed in the stack of weights 25. Stabilizer 27 may be at any desired point above the bit 11, and is normally about 5 to 50 feet from the bottom of shaft 13. Stabilizer 27 has upper and lower adapter plates 29 and 31 that contact the weights 25 above and below the stabilizer 27. Stabilizer 27 has an inner hub 33 that is carried between the weights 25 and encircles the outer pipe 21. Inner hub 33 is metal and has double cylindrical walls, including an inner cylindrical wall 33a and an outer cylindrical wall 33b. The inner and outer walls 33a and 33b are separated and are closed at the top and bottom by annular caps, which are welded to the walls.

A resilient tube or sleeve 35 of rubber or the like is closely received within the inner hub inner wall 33a. Resilient tube 35 is located between the inner wall 33a and the outer wall of outer pipe 21. A metal retaining cylinder 37 is also closely and slidingly received within the inner wall 33a. Retaining cylinder 37 is of the same inner and outer diameters as the resilient tube 35 and is carried above it. A retaining ring 39 is mounted above the top of the retaining cylinder 37 by bolts. Tightening these bolts moves the retaining cylinder 37 downward against the resilient tube 35 to deform the tube between the outer pipe 21 and inner hub 33, locking them together. This means for securing the stabilizer inner hub 33 to the drill bit is shown and described in more detail in pending patent application Ser. No. 12,277, filed Feb. 15, 1979, John M. Mullins and Joseph L. Kelly, Jr., now U.S. Pat. No. 4,293,039, issued Oct. 6, 1981. This application and the above-mentioned Mullins et al application are commonly owned by the same assignee.

Figure 3:
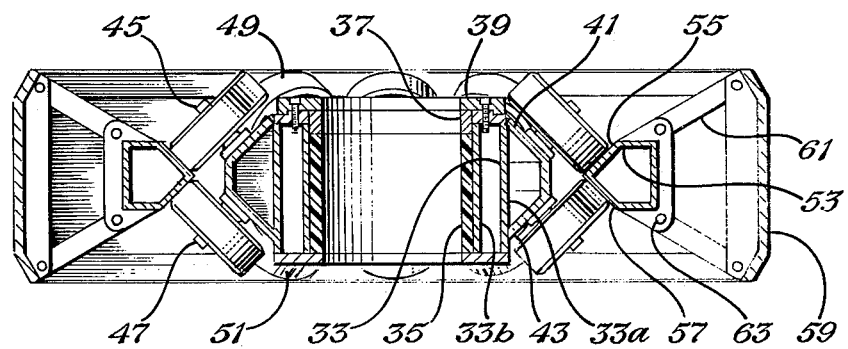
FIG. 3 is a partial vertical sectional view of the stabilizer of FIG. 2, taken along the line III—III of FIG. 2.

Referring to FIG. 3, the inner hub 33 has a mounting means that includes an upper frusto-conical plate 41 and a lower frusto-conical mounting plate 43. When viewed in vertical cross-section, as shown in FIG. 3, plates 41 and 43 are perpendicular to each other. Each intersect the vertical axis of the bit 11 at a 45 degree angle. A plurality of axles or bearing pins 45 are mounted normal to the upper plate 41 and equally spaced in a circular array. Similarly, a plurality of axles or bearing pins 47 are mounted normal to the lower plate 43 and spaced in a circular array. An upper roller 49 is mounted to each axle 45, and a lower roller 51 is mounted to each axle 47. In the preferred embodiment there are eight upper rollers 49 and eight lower rollers 51. All of the rollers 49 and 51 will be inclining at angles of 45 degrees with respect to the vertical. Each roller 49 and 51 is mounted to its respective axle 45 and 47 by a sealed bearing. Each roller 49 and 51 has a diameter considerably greater than its width.

An outer hub 53 is carried concentrically by the inner hub 33. Outer hub 53 has on its inner side an upper frusto-conical ring 55 that, when viewed in vertical cross-section as shown in FIG. 3, is normal to the upper mounting plate 41 of the inner hub 33. A lower frusto-conical ring 57 is secured below upper frusto-conical ring 55. Lower frusto-conical ring 57 faces downwardly and inwardly, and is perpendicular to the lower mounting plate 43, when viewed in vertical cross-section. The upper rollers 49 engage in rolling contact the upper frusto-conical ring 55. The lower rollers 51 engage in rolling contact the lower frusto-conical ring 57. The rollers 49 and 51 and the rings 55 and 57 serve as bearing means between the inner hub 33 and outer hub 53.

A centralizer means is mounted to the outer hub 53 and extends laterally outward for frictionally engaging the walls of the shaft 13 when the bit wanders off-center. In the preferred embodiment, the centralizer means includes a cylindrical ring 59 that is slightly less in diameter than the shaft 13. Centralizer ring 59 is concentric with the inner hub 33 and outer hub 53, and is mounted to the outer hub 53 by a plurality of arms 61. Arms 61 are V-shaped, as shown in FIG. e, and are secured to the outer hub 53 by fasteners such as pins or bolts 63.

In operation, the stabilizer 27 can be assembled by first placing the lower adapter plate 31 on a weight 25. Then the inner hub 33 is placed on the adapter plate 31. The metal retaining cylinder 37 is tightened against the resilient tube 35 by the retaining ring 39 until the inner hub 33 is tightly secured to the drill string. The outer hub 53 will be supported in place by the upper and lower rollers 49 and 51. The upper adapter plate 29 is placed on top of the retaining ring 39, and additional weights 25 are placed above. The weights 25 are supported by the inner hub 33, thus their weight will not affect the bearing means between the inner and outer hubs 33 and 53. The arms 61 are secured to the outer hub 53 by bolts 63.

In operation, inner hub 33 and the upper and lower rollers 49 and 51 will rotate with the drill string since they are locked to the drill string by the resilient tube 35. If the bit is on-center, centralizing ring 59 will not contact the wall of shaft 13. If the bit wanders off-center, the centralizing ring 59 will frictionally engage the shaft 13, allowing the inner hub 33 to rotate with respect to the outer hub 53. Since the centralizing ring 59 is slightly less in diameter than the shaft 13, the ring 59 will rotate a short distance from time to time. However, the uneven texture of the shaft 13 wall and slight misalignment will prevent substantial rotation of the ring 59.

The invention has significant advantages. The stabilizer arms and centralizing ring do not rotate with the bit, reducing wear on the part of the stabilizer in contact with the shaft wall. The rollers rolling upon the frusto-conical rings provide a bearing that has low frictional resistance, requiring only a small amount of torque to cause rotation between the inner and outer hubs.

While the invention has been shown in only one of its forms, it should be apparent to those skilled in the art that it is not so limited, but is susceptible to various changes and modification without departing from the spirit thereof. For example, the rollers could be mounted to the outer hub and the frusto-conical rings mounted to the inner hub.

I claim:

1. An apparatus for centering a drill string in a shaft, comprising in combination:
    an inner hub encircling the drill string;
    mounting means for mounting the inner hub to the drill string for rotation therewith;
    an outer hub encircling the inner hub;
    centralizing means carried by the outer hub and extending laterally outward for frictionally engaging a wall of the shaft if the drill string becomes off-center in the shaft; and
    a plurality of rollers rotatably mounted to one of the hubs and in rolling contact with the other of the hubs to allow rotation of the hubs with respect to each other.

2. An apparatus for centering a drill string in a shaft, comprising in combination:
    an inner hub encircling the drill string;
    mounting means for mounting the inner hub to the drill string for rotation therewith;
    an outer hub encircling the inner hub;
    centralizing means carried by the outer hub and extending laterally outward for frictionally engaging a wall of the shaft if the drill string becomes off-center in the shaft;
    one of the hubs having a concentric frusto-conical ring; and
    a plurality of rollers rotatably mounted in a circular array to the other of the hubs and in rolling engagement with the ring, to allow the centralizing means to remain in a nonrotating condition while the drill string rotates.

3. An apparatus for centering a drill string in a shaft, comprising in combination:
    an inner hub encircling the drill string;
    mounting means for mounting the inner hub to the drill string for rotation therewith;
    an outer hub encircling the inner hub;
    centralizing means carried by the outer hub and extending laterally outward for frictionally engaging a wall of the shaft if the drill string becomes off-center in the shaft;
    one of the hubs having upper and lower frusto-conical rings mounted one above the other;

a set of upper rollers rotatably mounted on individual axles in a concentric array to the other of the hubs and in rolling contact with the upper frusto-conical ring; and a set of lower rollers rotatably mounted on individual axles in a concentric array below the upper rollers to the same hub, the lower rollers being in rolling contact with the lower ring.

4. An apparatus for centering a drill string in a shaft, comprising in combination:

a plurality of upper rollers spaced in a circular array, each upper roller rotatably mounted on an axle facing upwardly and outwardly;

a plurality of lower rollers spaced in a circular array, each lower roller rotatably mounted on an axle facing downwardly and outwardly;

means for securing the axles of the upper and lower rollers in a concentric array around and to the drill string for rotation of the array when the drill string rotates;

an upper frusto-conical ring carried concentrically around the upper rollers for rolling engagement with the upper rollers;

a lower frusto-conical ring carried concentrically around the lower rollers for rolling engagement with the lower rollers; and a centralizing means mounted to the upper and lower frusto-conical rings and extending laterally outward for frictional engagement with the wall of the shaft if the drill string becomes off-center in the shaft.

5. In an apparatus for centering a drill string in a shaft of the type having an inner hub secured to the drill string for rotation therewith, upper and lower frusto-conical rings concentrically encircling the inner hub, and a centralizing means extending laterally outward from the rings for frictionally engaging the wall of the shaft if the drill string becomes off-center in the shaft, an improved bearing means between the inner hub and rings, comprising:

a plurality of upper rollers mounted concentrically in a circular array to the inner hub for rolling engagement with the upper ring; and a plurality of lower rollers mounted concentrically in a circular array to the inner hub below the upper rollers for rolling engagement with the lower ring.

* * * * *